INVENTOR:
Emil Projahn
By Walter Becker

United States Patent Office 3,254,791
Patented June 7, 1966

1

3,254,791
SAFETY CLOSURE FOR THE FILLING VALVE OF A FUEL RESERVOIR OF LIGHTERS
Emil Projahn, Nurnberg, Germany, assignor to Metallwarenfabrik Birrwil AG., Birrwil, Aargau, Switzerland
Filed May 8, 1963, Ser. No. 279,684
3 Claims. (Cl. 220—86)

The present invention relates to a closure provided with a closure lid designed as a handle, said closure being intended for the filling valve of a fuel reservoir for a lighter.

Closure means are known for preventing an undesired opening or the soiling and clogging up of filling valves, which closure means are designed, for instance, as a threaded plug or are provided with a bayonet joint.

It is an object of the invention to provide an improved closure for the above-outlined purpose.

It is another object of this invention to provide a closure for the filling valve of a fuel reservoir for a lighter, which, while being simple in construction, will also be able to lock or additionally hold the valve to be closed.

These and other objects and advantages of the invention will appear more clearly from the following specification in connection with the accompanying drawings, in which.

Figure 1:
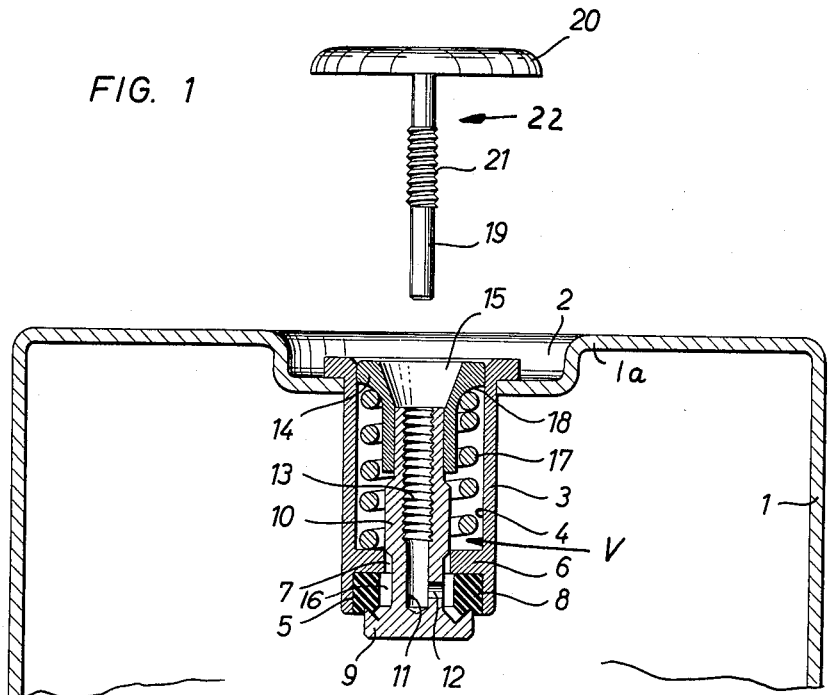
FIGURE 1 is a diagrammatic section through a filling valve according to the invention with the closure screwed out of said valve.

The arrangement according to the present invention is characterized in that the valve comprises a longitudinal threaded bore for threaded engagement with a bolt carrying at one end thereof a cover member forming a closure element, said bolt simultaneously serving as tightening element for compressing a sealing member.

Referring now to the drawing in detail, the fuel reservoir 1, which may be filled with lighter fluid or with a gas, has its bottom 1a provided with a pan-shaped depression 2 for receiving a supporting member 3 for the filling valve. The said supporting means 3 has bores 4 and 5 separated from each other by a collar 6 with a bore 7 therein. Bore 5 has inserted thereinto a sealing ring 8. The filling valve, generally designated "V," comprises a dish-shaped portion or head 9 with a shank 10 thereon which latter has a longitudinal bore 11 and a transverse bore 12 at the lower end of bore 11. Adjacent bore 12, shank 10 and seal 8 confine with each other an annular chamber 16. The said spindle 10 is guided in the bore 7 of collar 6. The upper portion of spindle 10 is provided with an inner thread 13.

Frictionally connected to the upper portion of spindle 10, for instance by a press-fit, is a filling connection 14 with a funnel 15. Collar 6 serves as abutment for the lower end of a spring 17 the upper end of which rests against a collar 18 of the connection 14. A closure member, generally designated 22, cooperates with valve V, as will presently appear. Closure member 22 has a head 20 which may be knurled or may have its peripheral portion grooved for easier handling. Connected to the head 20 is a shank 19 with a threaded portion 21 for engagement with the thread 13 in the spindle 10. It will be appreciated that when the bolt or shank 19 is introduced into spindle 10 so that thread 21 engages the threaded bore 13, it will be possible, by turning the head 20 (see FIG. 2) to pull the spindle 10 upwardly and thereby press the spindle head 9 against the seal 8 so that the latter seals in a gastight manner while the closure member 22 properly locks itself. In this way, the seal 8 will act as a perfect seal

2 when the closure member 22 is properly seated. In this position, the top surface of head 20 will be substantially flush with the bottom 1a of the reservoir 1.

When head 20 with its shank 19, 21 is unscrewed and removed, as shown in FIG. 1, the funnel 15 of the filling connection 14 is free to receive the nipple of the filling bottle.

When such nipple is pressed downwardly against funnel 15, the latter together with valve shank 10 moves downwardly so that valve head 9 is lifted off the sealing ring 8 and fuel can pass through bores 11 and 12 and annular chamber 16 into the tank or reservoir 1.

Figure 2:
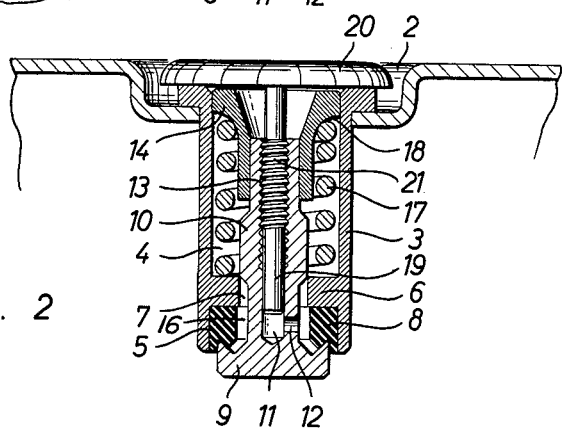
FIGURE 2 illustrates a section similar to that of FIGURE 1 but with the closure of the invention inserted into said valve.

When the filling operation has been completed and the nipple of the filling bottle is taken off the funnel, spring 17 returns funnel 15 and valve shank 10 with valve head 9 into the closing position thereof shown in FIG. 1. By again inserting closure member 19, 20 as shown in FIG. 2, funnel 15 is closed and valve head 9 is firmly pulled into its valve closing position as likewise shown in FIG. 2.

It is, of course, to be understood that the present invention is, by no means, limited to the particular construction shown in the drawing, but also comprises any modifications within the scope of the appended claims.

What I claim is:

1. In combination with a fuel reservoir for a lighter: conduit means axially movably supported by said reservoir and having an inlet for connection with a fuel supply and also having an outlet for communication with the interior of said reservoir, the interior of said conduit means being provided with a threaded portion, sealing means arranged adjacent said outlet and supported by said reservoir, a sealing head connected to said conduit means for cooperation with said sealing means and normally preventing communication between said outlet and the interior of said reservoir, and threaded bolt means having a head section for abutment with said reservoir and threadedly and adjustably engaging said threaded portion of said conduit means for selectively pulling said sealing head against said sealing means, said threaded bolt means also being detachable from said conduit means to thereby permit free access to said inlet for filling said reservoir while simultaneously permitting movement of said head away from said sealing means to establish communication between said conduit means and the interior of said reservoir.

2. An arrangement according to claim 1, in which that portion of said reservoir against which said head portion abuts forms a depression having a depth substantially equalling the thickness of said head portion.

3. In combination with a fuel reservoir of a lighter: tubular supporting means supported by and connected to the reservoir and extending thereinto, a valve member axially slidably arranged in said supporting means and having a hollow valve shank with a thread in the interior thereof, said valve shank having one end adjacent the area of connection of said supporting means with said reservoir provided with a fuel inlet and having its other end provided with a fuel outlet, sealing ring means supported by said supporting means adjacent said other end of said valve shank and confining therewith an annular chamber communicating with said outlet and adapted to communicate with the interior of said reservoir, a valve head connected to said other shank end and adapted to engage said sealing ring means for preventing communication of said annular chamber and thereby of said outlet with the interior of the reservoir, said valve head also being adapted to disengage said sealing ring means to thereby establish communication between said annular chamber and the interior of said reservoir, yieldable spring means arranged within said supporting means and continuously urging said valve head into sealing engagement with said sealing ring means, a closure member having a head for closing said inlet, and abutment means arranged stationarily with regard to said supporting means for abutment with said closure member, said closure member having a threaded shank adapted threadedly to engage said thread of said valve shank for selectively pulling said valve head into tight sealing engagement with said sealing ring means, the threaded shank of said closure member also being adapted to disengage the thread of said valve shank to thereby permit removal of said closure member from said reservoir to release said valve member and to permit free access to said fuel inlet for filling said reservoir.

References Cited by the Examiner

UNITED STATES PATENTS

| | | | |
|---|---|---|---|
| 1,748,323 | 2/1930 | Aronson | 67—7.1 |
| 2,297,326 | 9/1942 | Rieser | 220—86 |
| 2,298,789 | 10/1942 | Hill et al. | 220—86 |
| 2,618,416 | 11/1952 | Thorpe | 222—542 X |
| 2,769,325 | 11/1956 | Storch | 141—325 X |
| 3,006,406 | 10/1961 | Goddard | 67—7.1 |
| 3,044,503 | 7/1962 | Iketani | 67—7.1 |

LAVERNE D. GEIGER, *Primary Examiner.*

EDWARD J. MICHAEL, *Examiner.*

L. KING, E. EARLS, *Assistant Examiners.*